United States Patent [19]
Ziesenis

[11] Patent Number: 5,925,292
[45] Date of Patent: Jul. 20, 1999

[54] WATER CHARGING MACHINE

[75] Inventor: Randy T. Ziesenis, Edmond, Okla.

[73] Assignee: Aqua Life Corporation, Oklahoma City, Okla.

[21] Appl. No.: 08/867,290

[22] Filed: Jun. 2, 1997

[51] Int. Cl.$^6$ ................................................... B01F 3/04
[52] U.S. Cl. .................. 261/77; 261/79.2; 210/198.1; 210/222; 210/748
[58] Field of Search ................... 261/77, 79.2, 122.1, 261/124, DIG. 75; 210/222, 198.1, 695, 748

[56] References Cited

U.S. PATENT DOCUMENTS

| | | | |
|---|---|---|---|
| 4,147,630 | 4/1979 | Laval, Jr. | 210/137 |
| 4,215,081 | 7/1980 | Brooks | 261/122.1 |
| 4,229,389 | 10/1980 | Granger | 261/77 |
| 4,614,596 | 9/1986 | Wyness | 261/79.2 |
| 4,981,582 | 1/1991 | Yoon et al. | 261/122.1 |
| 5,049,320 | 9/1991 | Wang et al. | 261/122.2 |
| 5,326,446 | 7/1994 | Binger | 210/748 |
| 5,391,294 | 2/1995 | Mercier | 210/151 |
| 5,470,465 | 11/1995 | Moorehead | 210/205 |
| 5,472,620 | 12/1995 | Huang | 210/748 |
| 5,705,060 | 1/1998 | Robberts | 210/198.1 |
| 5,716,520 | 2/1998 | Mason | 210/222 |

FOREIGN PATENT DOCUMENTS

| | | |
|---|---|---|
| 1483324 | 4/1967 | France . |
| 4433024 | 5/1996 | Germany . |

OTHER PUBLICATIONS

Exhibit "A".
Exhibit "B".

*Primary Examiner*—C. Scott Bushey
*Attorney, Agent, or Firm*—Dunlap, Codding & Rogers, P.C.

[57] ABSTRACT

A water charging machine wherein the water being treated is moved downwardly through a vertically extending outer vortex and then moved in an upwardly extending inner vortex within the outer vortex. Oxygen may be introduced into the stream of water either upstream of the outer vortex or at the point of reversal of the water between the outer vortex and the inner vortex, or both, to provide a long shelf life incorporation of the gaseous oxygen in the water. The water and oxygen may also be exposed to a negative or positive magnetic field and a piezoelectric field to provide a substantial Zeta potential.

29 Claims, 7 Drawing Sheets

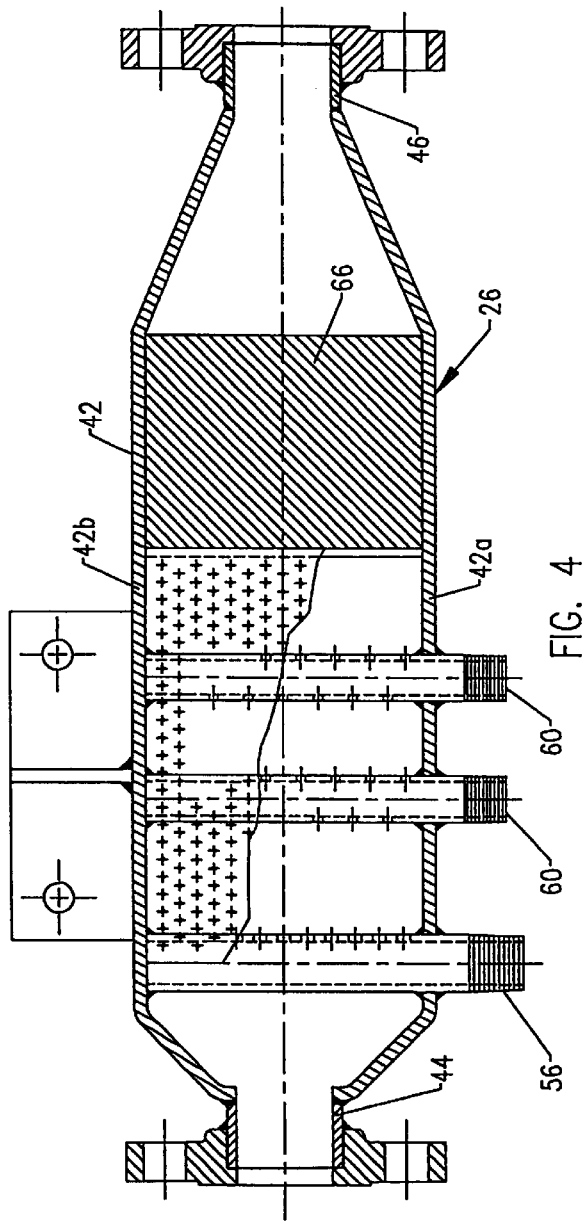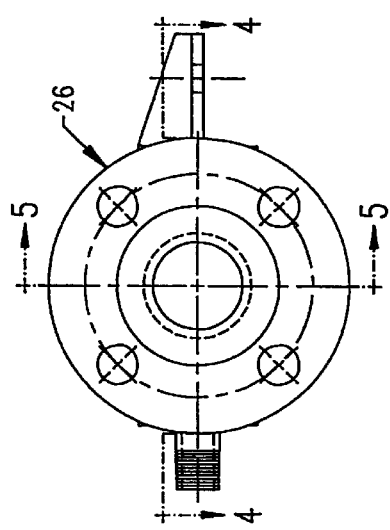

WATER CHARGING MACHINE

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

It is now generally recognized that most people suffer from a lack of adequate oxygen for optimal body functions. For example, it is generally recognized that the oxygen level in the air is much below what it was many years ago. Many efforts have been made to provide a supplemental supply of oxygen. The most obvious way is to provide a mask connected to a supply of gaseous oxygen; however, such use is inconvenient and can be dangerous if not properly monitored.

Other efforts have included incorporation of additional oxygen in water based products, such as drinking water. Heretofore, however, such attempts have not been adequate for a variety of reasons, such as the inability of presently known techniques for incorporating gaseous oxygen in water in such a manner that the oxygen will be retained in the water over extended periods of time, particularly after the container for the water is opened to atmospheric pressure.

BRIEF SUMMARY OF THE INVENTION

In accordance with the present invention, a stream of water in which oxygen is to be incorporated is first directed downwardly in an outer vortex, and then directed upwardly through an inner vortex within the outer vortex. The oxygen could be incorporated into the stream of water by being introduced into the stream before the stream is moved through the first outer vortex, as well as being introduced at the point of reversal of the stream from the outer vortex to the inner vortex, or both.

In a preferred embodiment, the gaseous oxygen introduced into the stream prior to the stream entering the first outer vortex is introduced in smaller bubbles than is the gaseous oxygen introduced into the stream at the point of reversal between the outer and the inner vortexes. Also, in the preferred embodiment, the water is moved in each vortex in a clockwise direction looking in the direction of movement of the stream.

BRIEF DESCRIPTION OF THE SEVERAL VIEWS OF THE DRAWINGS

FIG. 3 is an end view of an oxygen mixer.

FIG. 4 is a sectional view taken along lines 4—4 of FIG. 3.

DETAILED DESCRIPTION OF THE INVENTION

Figure 1:
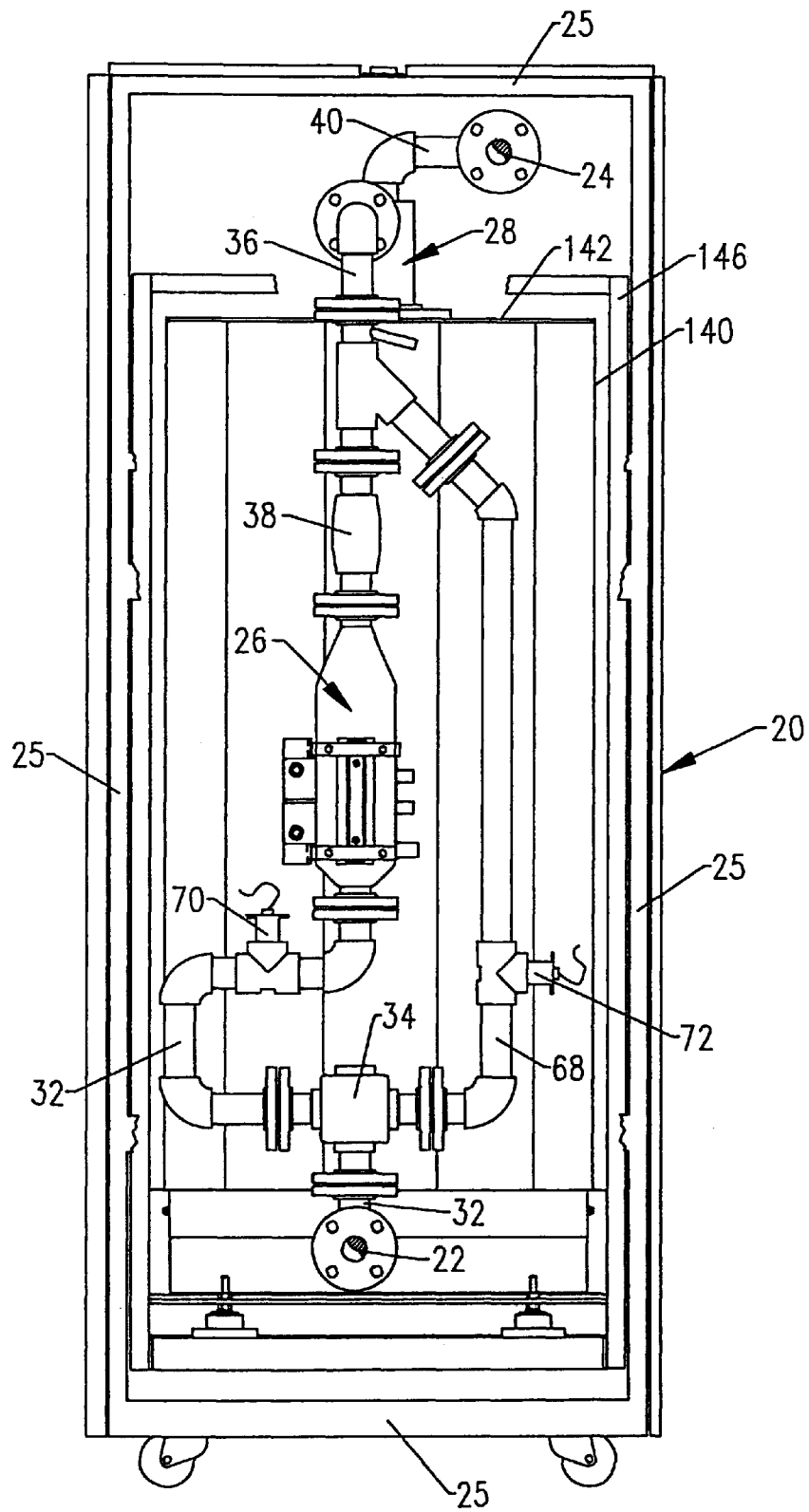
FIG. 1 is an elevational view of one end of the machine with the usual covering doors removed to show the internal construction of the machine.
Figure 2:
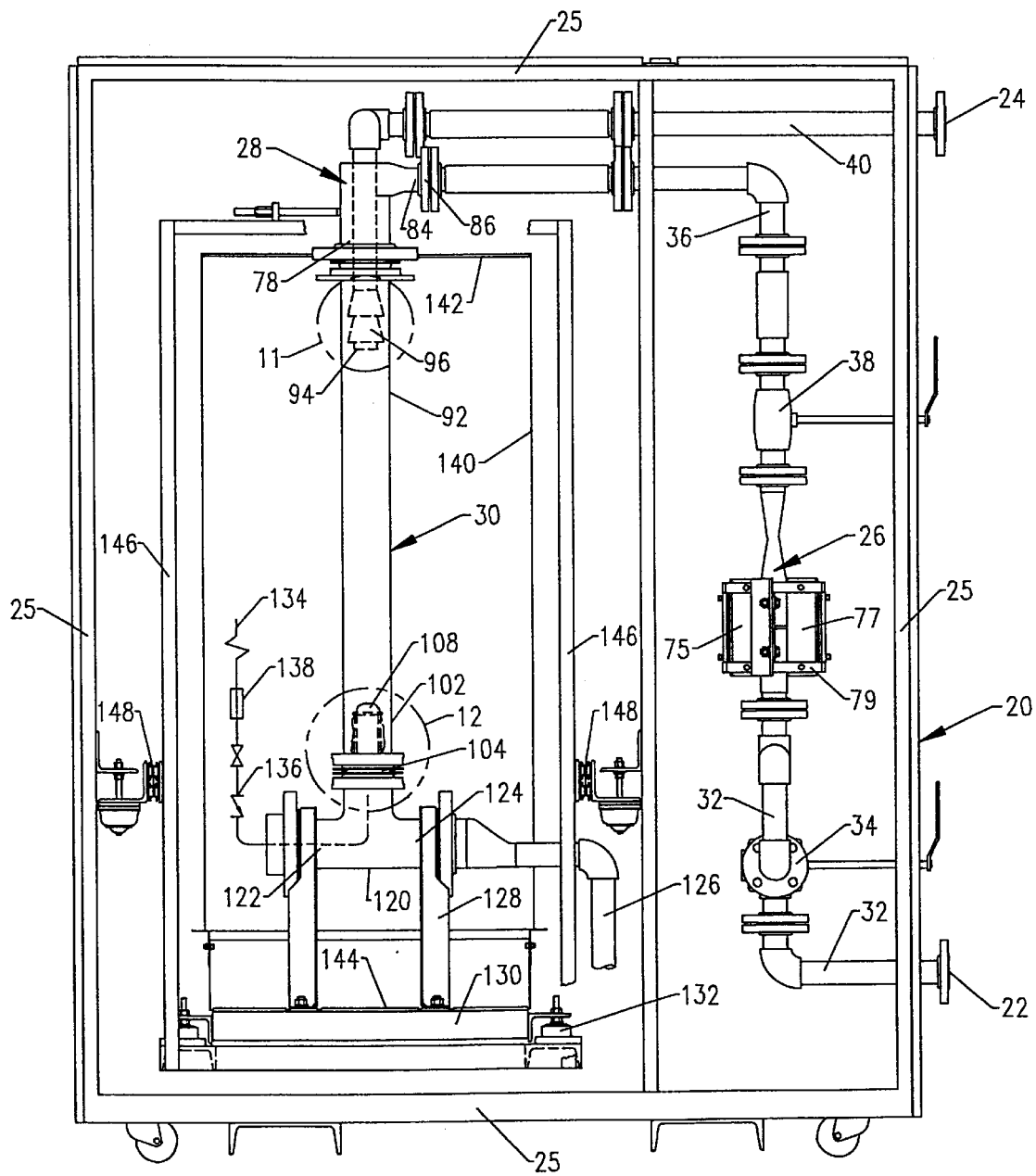
FIG. 2 is a side elevational view of the machine with the usual doors removed to show the internal construction.

Referring to the drawings in detail, and particularly FIGS. 1 and 2, reference character 20 generally designates the charging machine of this invention which is adapted to treat a stream of water entering the machine at an inlet 22 and being discharged from the machine through an outlet 24. The various components of the machine 20 are supported in a generally rectangular frame 25. In the main, the machine 20 comprises an oxygen mixer generally designated by reference character 26; a tangential unit generally designated by reference character 28, and a vortex unit generally designated by reference character 30.

The stream of water being treated is directed from the inlet 22 through suitable piping 32, including a 3-way ball valve 34 into the oxygen mixer 26 where gaseous oxygen is mixed with the stream of water. The oxygen laden stream of water is then directed through additional piping 36, including a valve 38, into the tangential unit 28. The tangential unit 28 performs the function of directing the stream of water in a circular motion, that is, a vortex, downwardly through the vortex unit 30. The outer vortex of water is reversed at the lower end portion of the vortex unit 30 into an inner vortex which moves upwardly through the vortex unit 30 for discharge through the tangential unit 28 and suitable piping 40 to the water outlet 24.

Figure 5:
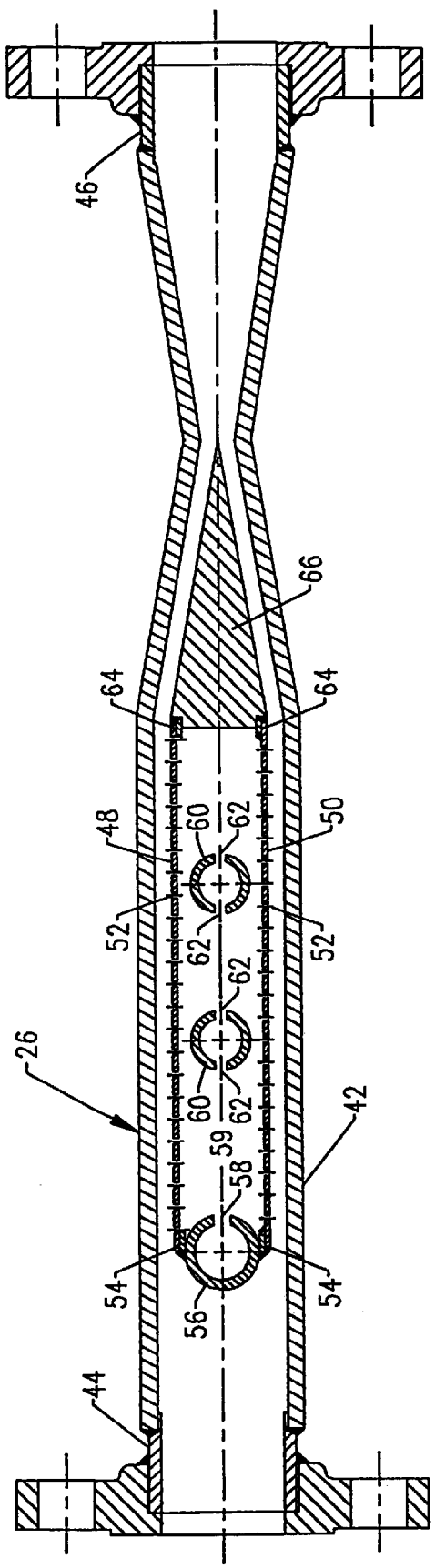
FIG. 5 is a sectional view taken along lines 5—5 of FIG. 3.
Figure 7:
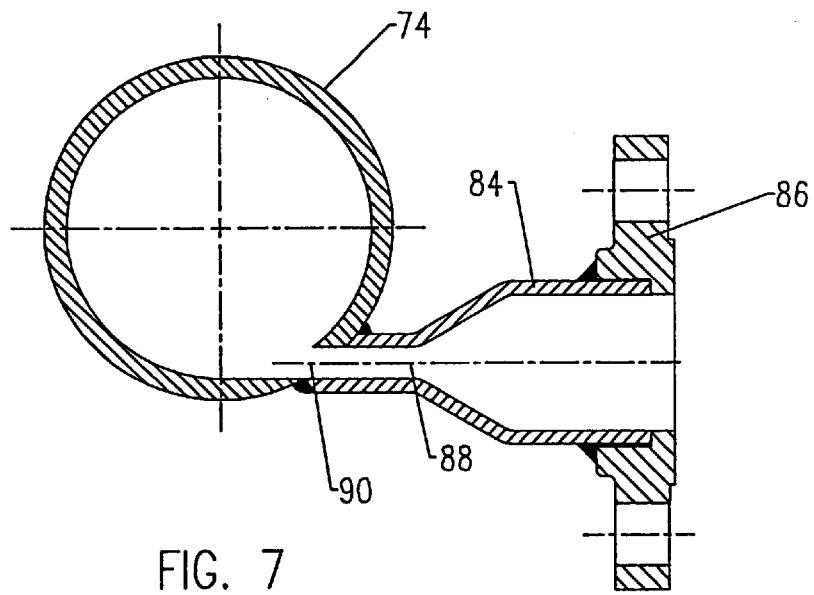
FIG. 7 is a sectional view taken along lines 7—7 of FIG. 6.
Figure 6:
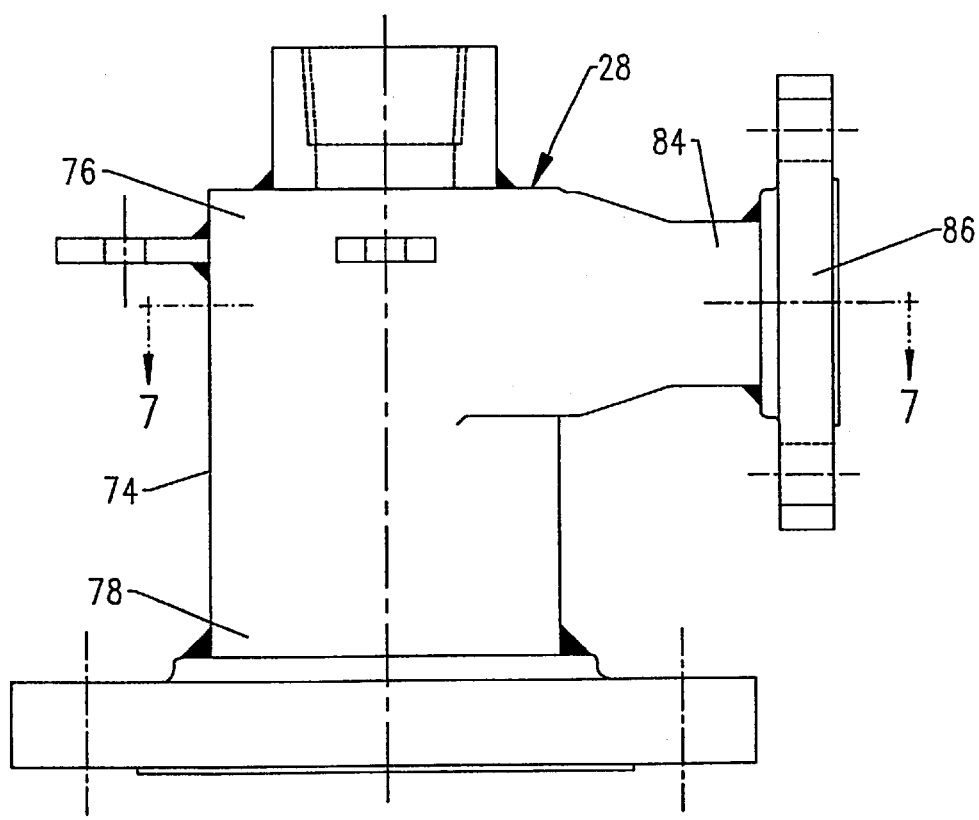
FIG. 6 is a side view of the tangential inlet.
Figure 8:
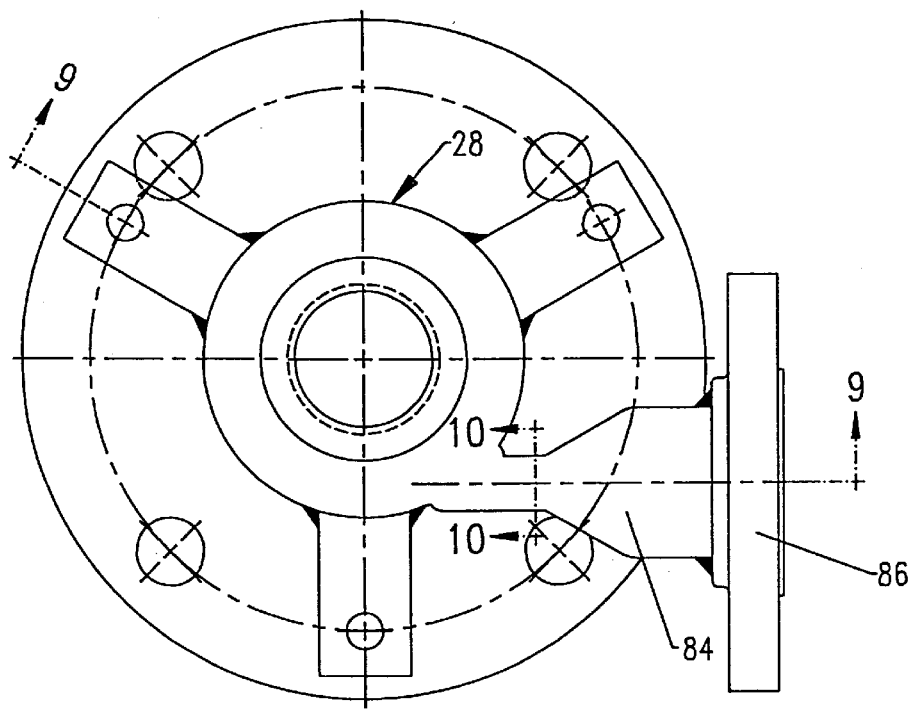
FIG. 8 is a plan view of the tangential inlet.
Figure 10:
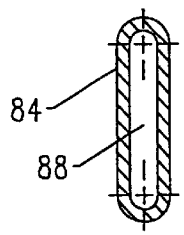
FIG. 10 is a sectional view taken along lines 10—10 of FIG. 8.
Figure 9:
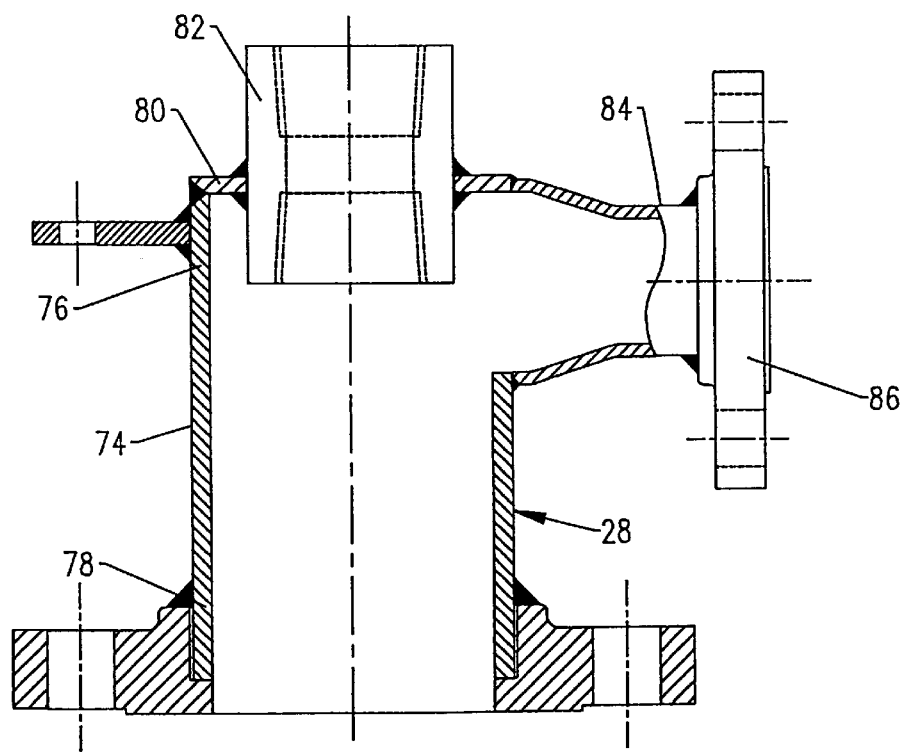
FIG. 9 is a sectional view taken along lines 9—9 of FIG. 8.

The oxygen mixer 26 is shown in detail in FIGS. 3, 4 and 5. The mixer 26 comprises a hollow body 42 which is generally rectangular in cross section through the major portion of its length, tapering from the water inlet 44 and then tapered inwardly toward the water outlet 46. A pair of rectangular plates 48 and 50 are mounted in parallel within the body 42. Each of the plates 48 and 50 has a plurality of apertures 52 therethrough to disburse oxygen into water flowing around the plates 48 and 50. The adjacent ends 54 of the plates 48 and 50 are closed by an oxygen tube 56 extending through one sidewall 42a of the body 42 into engagement with the opposite wall 42b of the body 42. The oxygen tube 56 has a plurality of apertures 58 in one side thereof communicating with the chamber 59 formed by the plates 48 and 50 for directing gaseous oxygen into that chamber. Two additional oxygen tubes 60 are also extended through the wall 42a of the body 42 into contact with the opposite wall 42b of the body 42. Each of the additional oxygen tubes 60 has a plurality of apertures 62 therein to feed gaseous oxygen into the chamber 59 formed between the plates 48 and 50. All of the tubes 56 and 60 are connected to a suitable supply of gaseous oxygen (not shown) by means of which oxygen is preliminarily mixed with the stream of water flowing through the body 42 on opposite sides of the plates 48 and 50.

The opposite ends 64 of the plates 48 and 50 are closed by the larger end of a flow diverter 66 formed to have a triangular cross section. The diverter 66 facilitates a non-turbulent flow of water through the body 42 and thereby facilitates a retention of small oxygen bubbles in the stream of water being discharged from the mixer 26 through the outlet 46. As previously stated, this oxygen-laden water is then directed into the tangential unit 28.

In the event the mixer unit 26 is not used for preliminarily mixing oxygen with the stream of water, a bypass line 68 (see FIG. 1) is connected to the line conduit 32 by the 3-way ball valve 34. The by-pass line 68 re-connects with the piping 36 downstream from the mixer 26. Thus, the incoming stream of water may be directed either through the oxygen unit 26 or may bypass the oxygen unit 26. Suitable flow meters 70 and 72 are interposed in the line 32 and the bypass line 68, respectively, to suitably record the flow of water.

In a preferred embodiment, a pair of magnets 75 and 77 (FIG. 2) are suitably supported by straps 79 on opposite sides of the mixer 26 to produce a magnetic field through which the water and oxygen flowing through the mixture 26 are exposed. Preferably, the magnets 75 and 77 are arranged with their south poles facing the body 42 of the mixer unit in order to provide a negative magnetic field in the mixer 26.

The tangential unit 28 is shown in detail in FIGS. 6 through 10 and basically comprises a tubular body 74 having an upper end 76 and a lower end 78. The upper end 76 of the body 74 is closed by a plate 80 (FIG. 9) and a pipe fitting 82 (which receives a tubular member as will be set forth below). The inlet 84 of the tangential unit has a suitable flange 86 at its outer end for connection with the inlet pipe 36, and then swedges into a vertically oriented member having a vertically oriented opening 88 therein which mates with an identical vertically oriented opening 90 formed in the sidewall of the body 74. The center line of the opening 90 is on a tangent with respect to the inner periphery of the body 74, such that water being directed through the inlet 90 will flow around the inner periphery of the tangential unit 74 and then, by virtue of the upper end 76 of the body 74 being closed, the swirling stream of water flows downwardly out through the lower end 78 of the body 74. It will also be noted that the inlet opening 90 is at the upper end portion of the body 74.

Figure 11:
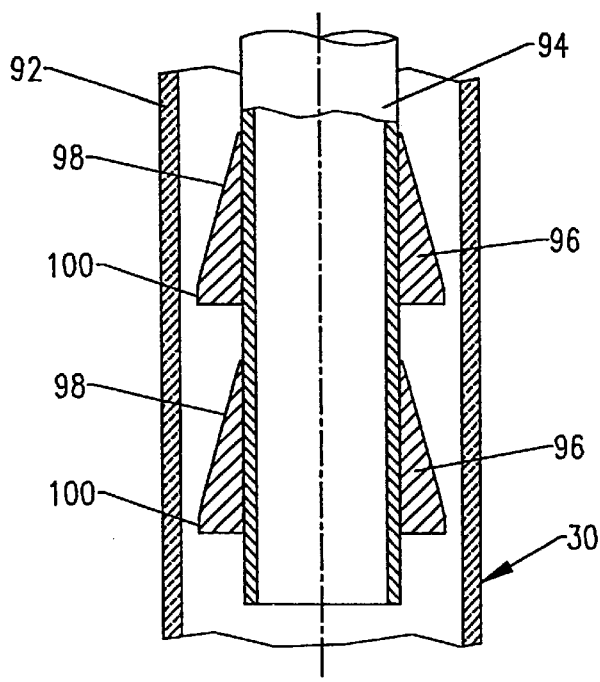
FIG. 11 is an enlarged sectional view of a portion of the vortex forming unit indicated by the circle designated 11 in FIG. 2.
Figure 13:
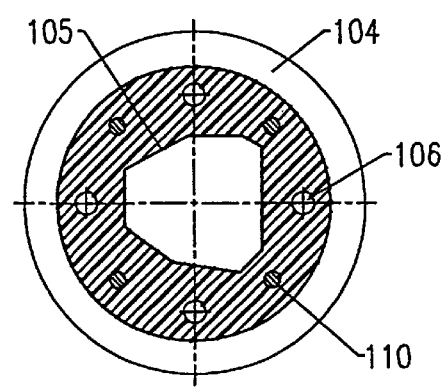
FIG. 13 is a sectional view taken along lines 13—13 of FIG. 12.
Figure 12:
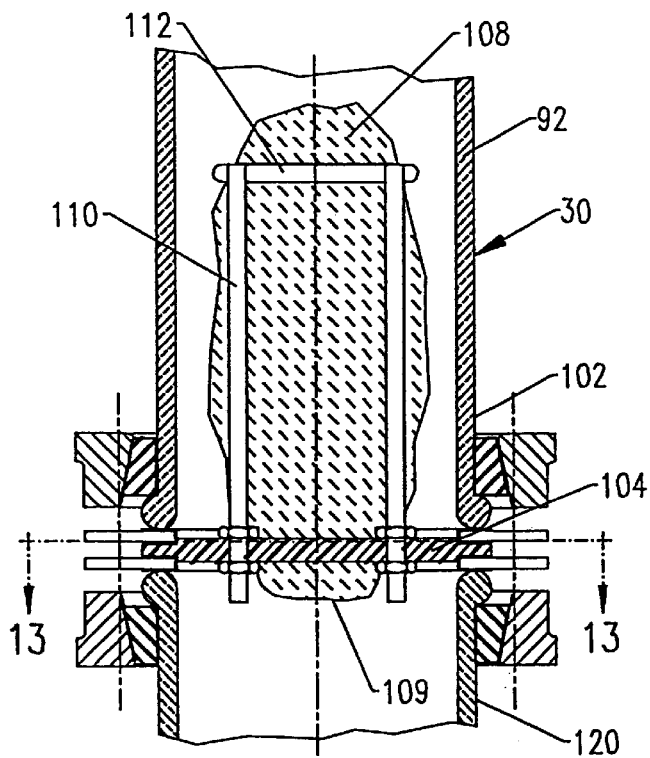
FIG. 12 is an enlarged sectional view of another portion of the vortex forming unit indicated by the circle designated 12 in FIG. 2.

The lower end 78 of the tangential inlet body 74 is suitably connected (FIG. 2) to the upper end of a vertically extending tubular member 92. As shown in FIGS. 2 and 11, there is a second tubular member 94 located within the upper end portion of the first tubular member 92. The tubular member 94 is secured in the fitting 82 (FIG. 9) at the upper end of the tangential unit 28 and forms an outlet for water from the vortex unit 30.

A pair of frusto-conical members 96 are secured on the inner tubular member 94 inside the upper end portion of the outer tubular member 92. Each of the frusto-conical members 96 has an outer surface 98 which tapers downwardly and outwardly, with the outer diameter of the lower end 100 of each frusto-conical member 96 having a diameter less than the inner diameter of the outer tubular member 92. Thus, water directed from the tangential unit 28 into the upper end of the outer tubular member 92 will be maintained in circular motion, that is, a vortex, down along the inner periphery of the outer tube 92.

The outer tubular member 92 is preferably transparent glass. It should also be noted that the inlet opening 90 (FIG. 7) of the tangential unit 28 is arranged such that the stream of water is directed in a clockwise movement around the inner periphery of the tangential body 74 as well as around the inner periphery of the tubular member 92 when viewed in the direction of water flow. For some uses, however, the inlet opening 90 may be arranged to direct the water in a counter clockwise direction.

The lower end portion 102 of the outer tubular member 92 is substantially closed by an obstruction 104. The obstruction 104 preferably comprises a flat plate having a plurality of apertures 106 therethrough through which oxygen can be introduced into the lower end of the vortex unit 30 and water can be drained from the vortex unit 30 when the unit is stopped. There is also a centrally located opening 105 in the central portion of the plate 104.

A piezoelectric crystal 108 is supported on the plate 104 with the lower end 109 of the crystal resting in the opening 105 in such a manner that the crystal 108 will be vibrated by the flow of water through the vortex unit 30. In this connection, it should also be observed that when the outer vortex formed around the inner periphery of the tubular member 92 reaches the obstruction 104, the flow of water is reversed to flow upwardly in the form of an inner vortex inside the outer vortex. The upperwardly flowing water enters the inner tubular member 94 at the upper end of the outer tubular member 92 and is discharged upwardly through the tangential unit 28 into the outlet piping 40 and, thus, to the water outlet 24.

The crystal 108 is supported on the plate 104 by circumferentially spaced rods 110 and a ring 112 attached to the upper ends of the rods 110. The lower ends of the rods 110 are suitably secured to the plate 104. With this arrangement, as previously indicated, the crystal 108 has room to, and does, vibrate in response to water flowing around it.

The lower end 102 of the outer tubular member 92 of the vortex unit 30 is suitably connected to a "T" 120, also as preferably formed of transparent glass. One end 122 of the T 120 is substantially closed, and the opposite end 124 communicates with a drain pipe 126, by means of which water is drained from the machine when the machine is stopped following an operation. The entire vortex unit 30 is suitably supported by a pipe support stand 128 from an intermediate floor 130 within the frame 25. The floor 130 is preferably supported by adjustable mounts 132 from the frame 25 in order that the vortex unit 30 can be precisely aligned with the tubular member 92 being vertical. Such orientation improves the control over the formation and positioning of the inner vortex.

Another oxygen conduit 134 extends from the oxygen supply (not shown) through the end 122 of the "T" 120 and to the vicinity of the plate 104. Gaseous oxygen is thereby introduced into the vortex unit 30 essentially at the point of reversal of the stream of water between the outer vortex and the inner vortex, such that bubbles of gaseous oxygen will enter the inner vortex and be forced into the water flowing upwardly in the inner vortex. A suitable check valve 136 is interposed in the conduit 134 to prevent the back flow of water through the conduit 134 when the machine 20 is shut down. Also, a pair of magnets 138 are suitably supported on opposite sides of the conduit 134 to produce a magnetic field through which the oxygen flows before it is directed into the lower end of the vortex unit 30. The magnets 138 are preferably located with their south poles on the opposite sides of the conduit 134 to provide a negative magnetic field through which the oxygen passes.

An assembly of mirrors 140 are provided in an arrangement to completely surround the vortex unit 30, with the reflective faces of the mirrors facing inwardly toward the vortex unit 30. It has been found that an assembly of twelve mirror panels can be easily arranged around the vortex unit 30 and supported on suitable slides (not shown) in order that the mirror panels may be moved for access to the vortex unit 30. Further, mirrors 142 and 144 are preferably arranged above and below the vortex unit 30, with the reflective faces thereof facing the vortex unit 30.

It is also preferable to mount the vortex unit 30 and associated components, including the mirrors 140, 142 and 144, in a subframe 146 by means of slide racks 148 within the outer frame 25. With this arrangement, the vortex unit, which includes a substantial amount of glass, can be shipped separately from the remainder of the machine 20 and can be easily removed from the outer frame 25 for service.

Operation

In operation, when it is desired to utilize the mixer 26, the incoming stream of water is directed through the piping 32 into and through the mixer 26 where relatively small bubbles of gaseous oxygen are mixed in the water.

The oxygen laden water is then directed through the tangential unit 28 where the stream of water is directed in a swirling motion to form an outer vortex which moves downwardly through the outer tubular member 92 of the vortex unit 30. As previously stated, this other vortex preferably moves in a clockwise direction when looking in the direction of movement of the water. When the outer vortex reaches the lower end of the outer tubular member 92, the flow of water is reversed to flow upwardly in an inner vortex which is positioned inside the previously mentioned outer vortex. Also, at the point of reversal between the outer vortex and the inner vortex, additional oxygen may be introduced through the conduit 134, preferably in bubbles larger than the bubbles produced by the mixer unit 26. The oxygen is thereby fully incorporated in the stream of water discharging through the inner tubular member 94 and out to the water outlet 24.

As previously indicated, the stream of water may be bypassed around the mixer 26, if desired, and oxygen introduced only at the lower end of the vortex unit 30. Conversely, water may be introduced through the mixer unit 26 to provide a preliminary mixing of oxygen in the water and no oxygen introduced through the conduit 34 into the lower end portion of the vortex unit 30.

The use of the magnets 75, 77 and 138 result in desirable conditioning of the water passed through the machine 20. When such magnets are arranged with their south poles in opposing relation, the water discharged from the machine has a substantial Zeta potential, found to be highly desirable in many uses of water. Further, the crystal 108 produces a piezoelectric field through which the water passes in the vortex unit 30 for further conditioning of the water passed through the machine. It has been found that the use of the inner and outer vortexes in the vortex unit 30 produces a substantial amount of radiated energy in the form of a wide band of radio frequencies which is desirably contained within and around the mixer unit 30 by the mirrors 140, 142 and 144.

Changes may be made in the combination and arrangement of parts or elements and steps and procedures without departing from the spirit and scope of the invention as defined in the following claims.

What is claimed is:

1. A machine for incorporating oxygen in water, comprising:

a first vertically extending tubular member having an an upper end and a lower end;

an obstruction in the lower end portion of the first tubular member;

a second vertically extending tubular member having an an upper end and a lower end extending into the upper end of the first tubular member, forming an annulus between the first and second tubular members, and projecting above the upper end of the first tubular member;

a frusto-conical member having an upper end and a lower end mounted on the second tubular member in said annulus having a downwardly and outwardly tapered outer surface and having an outer diameter at its lower end less than the inner diameter of the first tubular member;

means at the upper end of the first tubular member surrounding the second tubular member connected to a stream of water for directing the stream of water in a circular motion down the first tubular member around the frusto-conical member;

whereby the stream of water forms a first vortex in the outer portion of the first tubular member, and, upon reversal at the lower end of the first tubular member, forms a second vortex inside the first vortex before discharge through the second tubular member;

wherein said obstruction comprises a plate spanning the first tubular member having at least one aperture therethrough; and further including:

a supply of gaseous oxygen;

a conduit connecting the supply of gaseous oxygen to the lower end of said first tubular member below said plate; whereby oxygen is supplied to the lower end of said first tubular member in bubbles which are incorporated into the second vortex;

a piezoelectric crystal in the lower end portion of said first tubular member above said obstruction; and means supporting said crystal allowing said crystal to vibrate in response to water flowing through said first tubular member.

2. A machine as defined in claim 1, characterized further to include:

a pair of magnets, one on each side of said conduit, producing a magnetic field through which the oxygen passes on its way to said first tubular member.

3. A machine as defined in claim 2 wherein said magnets are arranged with their south poles facing each other.

4. A machine as defined in claim 1 wherein said first tubular member is formed of transparent glass.

5. A machine as defined in claim 1 wherein the obstruction in the lower end portion of said first tubular member is in the form of a substantially flat plate.

6. A machine as defined in claim 1 characterized further to include a second frusto-conical member constructed in the same manner as the first mentioned frusto-conical member and mounted on the second tubular member below the first mentioned frusto-conical member.

7. A machine as defined in claim 1 wherein the means at the upper end of the first tubular member surrounding the second tubular member comprises a tubular body having an upper end and a lower end, with the lower end attached to the upper end of the first tubular member; said tubular body having a vertically extending opening in the wall thereof the center line of which extends on a tangent to the inner surface of said tubular body;

means closing the upper end of said tubular body and enclosing the adjacent portion of the second tubular member; and water inlet means communicating with said vertically extending opening, whereby the stream of water is directed in a circular motion around and down said first tubular body.

8. A machine as defined in claim 7 wherein said vertically extending opening is arranged to direct the stream of water in a clockwise motion, as viewed in the direction of flow.

9. A machine as defined in claim 1 characterized further to include mirrors surrounding said first tubular member.

10. A machine for incorporating oxygen in water, comprising:

a mixer for initially distributing gaseous oxygen in a stream of water;

a first vertically extending tubular member having an upper end and a lower end;

an obstruction in the lower end portion of the first tubular member;

a second vertically extending tubular member having an upper end and a lower end extending into the upper end of the first tubular member, forming an annulus between the first and second tubular members and projecting above the upper end of the first tubular member;

a frusto-conical member having an upper end and a lower end mounted on the second tubular member in said annulus having a downwardly and outwardly tapered outer surface and having an outer diameter at its lower end less than the inner diameter of the first tubular member; and means at the upper end of the first tubular member surrounding the second tubular member connected to the mixer for directing the stream of water from the mixer in a circular motion down the first tubular member around the frusto-conical member;

whereby the stream of water forms a first vortex in the outer portion of the first tubular member, and, upon reversal at the lower end of the first tubular member, forms a second vortex inside the first vortex before discharge through the second tubular member.

11. A machine as defined in claim 10 wherein said mixer comprises:

a hollow body having a first end with a water inlet therein and a second end with a water outlet therein;

a pair of plates supported in the body in parallel, spaced relation and having adjacent first ends and adjacent second ends, each of said plates having a plurality of apertures therethrough;

means for closing the spaces between the adjacent edges of said plates to form a chamber between said plates;

an oxygen tube extending into said chamber having the end thereof in said chamber closed and the end thereof projecting from said chamber connected to a supply of gaseous oxygen, said oxygen tube having a plurality of apertures therein located within said chamber to direct streams of oxygen into said chamber and thence through the apertures in said plates to be disbursed in the stream of water flowing through said body.

12. A machine as defined in claim 11 wherein said body is rectangularly shaped in cross section throughout a major portion of its length.

13. A machine as defined in claim 12 wherein said body is sized to provide a flow passageway for water around said plates at least as large as the inlet and outlet for the body, whereby the flow of water through said body will not be substantially restricted.

14. A machine as defined in claim 11 wherein said mixer includes at least two of said oxygen tubes, with one of said oxygen tubes forming a closure between the first ends of said plates.

15. A machine as defined in claim 13 wherein a flow diverter of substantially triangular shape in cross section has the larger end thereof forming the closure between the second ends of said plates and the smaller end thereof aligned with said water outlet, whereby the flow of water downstream of said plates will be substantially non-turbulent.

16. A machine as defined in claim 10 wherein said first tubular member is formed of transparent glass.

17. A machine as defined in claim 10 wherein the obstruction in the lower end portion of said first tubular member is in the form of a substantially flat plate.

18. A machine as defined in claim 10 characterized further to include a piezoelectric crystal in the lower end portion of said first tubular member above said obstruction; and means supporting said crystal allowing said crystal to vibrate in response to water flowing through said first tubular member.

19. A machine as defined in claim 10 characterized further to include a second frusto-conical member constructed in the same manner as the first mentioned frusto-conical member and mounted on the second tubular member below the first mentioned frusto-conical member.

20. A machine as defined in claim 10 wherein the means at the upper end of the first tubular member surrounding the second tubular member comprises a tubular body having an upper end and a lower end, with the lower end attached to the upper end of the first tubular member; said tubular body having a vertically extending opening in the wall thereof, the center line of which extends on a tangent to the inner surface of the body;

means closing the upper end of said tubular body and enclosing the adjacent portion of the second tubular member; and water inlet means communicating with said vertically extending opening, whereby the stream of water is directed in a circular motion around and down said first tubular member.

21. A machine as defined in claim 20 wherein said vertically extending opening is arranged to direct the stream of water in a clockwise motion as viewed in the direction of flow.

22. A machine as defined in claim 17 wherein said plate has at least one aperture therethrough, and characterized further to include a supply of gaseous oxygen directed through said aperture, whereby the oxygen passing through said aperture will be carried upwardly in said second vortex.

23. A machine as defined in claim 22 wherein the oxygen is passed through said aperture in bubbles.

24. A machine as defined in claim 23 wherein said oxygen is passed through said aperture in bubbles larger than the bubbles created by said mixer.

25. A machine as defined in claim 22 wherein said supply of oxygen to said aperture includes a conduit; a check valve in said conduit arranged to prevent a reverse flow of fluid through said conduit; and a pair of magnets on opposite sides of said conduit producing a magnetic field through which the oxygen passes.

26. A machine as defined in claim 25 wherein said magnets are arranged with their south poles facing each other.

27. A machine as defined in claim 11 characterized further to include a pair of magnets, one on each side of said mixer body, producing a magnetic field in said mixer.

28. A machine as defined in claim 27 wherein said magnets are arranged with their south poles facing each other.

29. A machine as defined in claim 10 characterized further to include mirrors surrounding said first tubular member.

* * * * *